INVENTOR.
Raymond G. Piety
BY Darby & Darby
Attorneys

Sept. 28, 1948. R. G. PIETY 2,450,352
SEISMIC WAVE CORRECTION MEANS AND METHOD
Filed July 25, 1944 3 Sheets-Sheet 2

INVENTOR.
Raymond G. Piety.
BY Darby & Darby
Attorneys.

Sept. 28, 1948.  R. G. PIETY  2,450,352
SEISMIC WAVE CORRECTION MEANS AND METHOD
Filed July 25, 1944  3 Sheets-Sheet 3
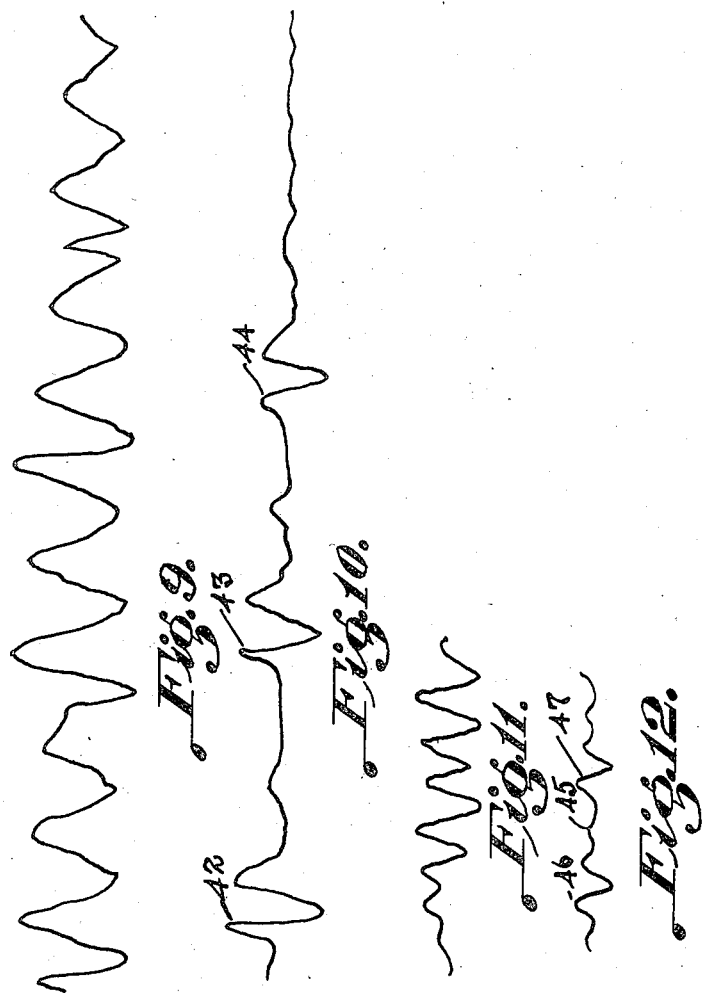
INVENTOR.
Raymond G. Piety
BY
Attorneys.

Patented Sept. 28, 1948

2,450,352

UNITED STATES PATENT OFFICE 2,450,352

SEISMIC WAVE CORRECTION MEANS AND METHOD

Raymond G. Piety, Yonkers, N. Y., assignor to Phillips Petroleum Company, a corporation of Delaware Application July 25, 1944, Serial No. 546,567

3 Claims. (Cl. 177—352)

This invention relates to an apparatus and method for the suppression of the terminal ends of wave trains and particularly electric wave trains as generated in the recording of seismic waves in seismic wave prospecting for oil, and especially when prospecting with reflection or refraction wave recording apparatus.

From a broader viewpoint the invention is also of utility in the sound ranging of enemy artillery pieces especially when a large number of guns are being fired more or less simultaneously.

The invention is generally related to any problem involving similar damped waves occurring closely with respect to time and, indeed, occurring in overlapping time periods.

The invention is of broad use in the study of electric waves produced by disturbances occurring so closely in time relation, such as are encountered in seismic prospecting, sound ranging of enemy artillery and the like, as to make it difficult to study graphic reproductions thereof because of interference between successive wave trains.

An object of this invention is to, in effect, separate the wave trains into independently identifiable wave graphs to facilitate the study and analysis thereof.

A more specific object of the invention is to modify the wave trains by suppression of the terminal ends thereof so as to render graphic reproductions of such wave trains independently identifiable with a minimum of distortion due to overlapping.

Another object of the invention is to so modify electrical wave trains representative of seismic wave trains that they are more easily recognized on the seismograph or other recording apparatus.

Another object of the invention is to make the records of such wave trains more easily readable so that equivalent points thereon may be measured as to time of arrival with greater accuracy and facility.

Numerous other objects and advantages of both the method and apparatus of the invention will be apparent to those skilled in the art in view of the following disclosure as amplified by the attached drawings.

This invention resides substantially in the combination, construction, arrangement, relative location of parts, steps and series of steps, as will be described in detail below.

In the accompanying drawings,

Figure 9 is a graphic record of the vibrations set up in a table upon which a steel ball has been bounced three times;

Figure 10 is a graphic record, as modified in accordance with this invention, of the disturbances illustrated in Figure 9;

Figure 11 is a graphic record of seismic reflection waves produced by two closely adjacent formations; and Figure 12 is a graphic record, modified in accordance with the principles of this invention, of the disturbances illustrated in Figure 11.

When a seismograph is used in the ordinary manner in the seismic prospecting for oil, for example, the reflected and refracted waves arriving through the ground are impressed upon a vibration sensitive pick-up commonly called in this art a geophone. The output of this pick-up device is in the form of electrical currents generated by and in accordance with the sound wave trains impressed upon the pick-up device. It frequently happens that several wave trains arrive at the pick-up point in very close time relation and, indeed, often in overlapping time relation so that the graphic reproductions thereof, as recorded on the recorder used with apparatus of this kind, are either compacted together or overlapped so that an accurate study thereof is difficult if not impossible. For example, in seismic prospecting when waves of reflected energy from two adjacent subterranean reflecting surfaces arrive at the pick-up point so as to be separated by a very small interval of time, or, in many cases, so as to be in overlapping relation, the recording equipment of necessity produces a graphic record which is confusing. Unless it is possible to consistently identify some equivalent point on each wave, the task of computing the depth of the reflecting or refracting surface is impossible. This difficulty cannot be solved by improved tuning methods in the recording apparatus as attempts along this line seem only to produce poorer records.

As a more specific example, the Hunton and Viola limestones in many places are close together and so thin that reflections from the upper and lower faces overlap to such an extent as to render measurement of the four depths involved impossible. Of course, it frequently happens that these depths which cannot be measured represent the very information that is being sought.

Ordinarily a reflected seismic wave train starts with a few cycles of low amplitude, builds up to a peak amplitude and then falls off to a negligible amplitude in about as many cycles as it took to build the wave trains up. The only method of estimating the arrival time of these wave trains when they are slightly overlapping is that represented by the skill and experience of the computer in recognizing in the graphic records the changes in appearance of these wave trains when they overlap and then estimating the arrival time. At best this is guesswork and when the overlapping is extensive even the skilled computer fails. By suppressing or cancelling the terminal oscillations of the wave trains of the reflected waves in accordance with this invention, the number of overlapping cycles is reduced making it possible to more easily determine equivalent points thereon.

It is a characteristic of damped waves that the frequency thereof throughout their existence is substantially constant and the absolute amplitude of points along the way, at corresponding instances, are substantially proportional. These relationships are taken advantage of in this invention.

Figure 1:
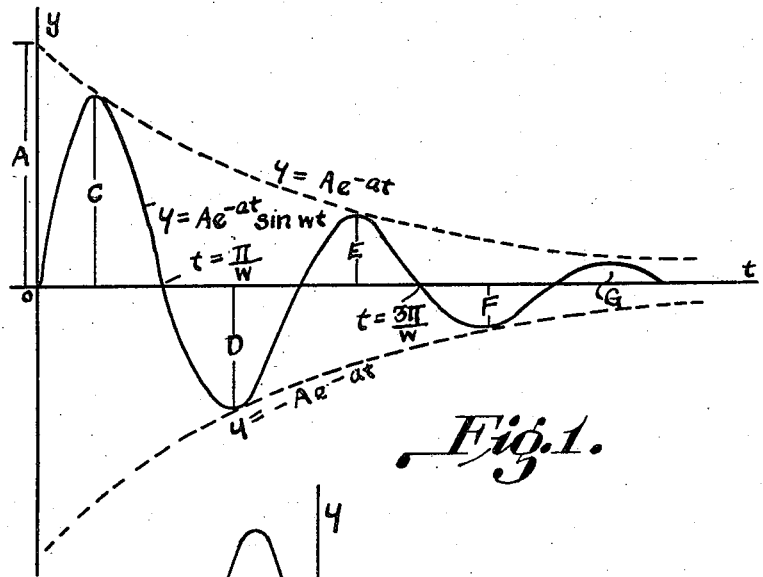
Figure 1 is a graph of a pure damped sine wave, the amplitude thereof being measured on the $y$ axis, and its time cycle on the $t$ axis.

In Figure 1 is illustrated a damped sine wave $y = Ae^{-at} \sin wt$ inside of asymptotic lines $y = Ae^{-at}$ and $y = -Ae^{-at}$. The frequency of this simple damped sine wave is absolutely constant, the curve crossing the $t$ axis at $$\frac{n\pi}{w}$$

where $n$ is an integer, $w$ is $2\pi$ times the frequency, $\pi$ is the ratio of the circumference of a circle to its diameter, that is, 3.1416, and $e$ is 2.7182818 (the natural logarithmic base).

In Figure 1, by reference to tables of powers of $e$ and sine tables, it becomes evident that the ratio of absolute amplitudes is as follows:

$$\frac{C}{D} = \frac{D}{E} = \frac{E}{F} = \frac{F}{G}$$

Therefore, each amplitude such as F is $$\frac{D}{C}$$

times the preceding amplitude such as E but of opposite sign, that is, $$F = \frac{-D}{C}E$$

Therefore, if a wave similar to that of Figure 1 but delayed in time by a half cycle and amplified by the factor $$\frac{D}{C}$$

were added to the wave in Figure 1 starting at any particular point, the remainder of the waves would cancel each other and, therefore, the terminal end of the wave train would be chopped off or suppressed. The apparatus of this invention is adapted to accomplish this very function.

Figure 2:
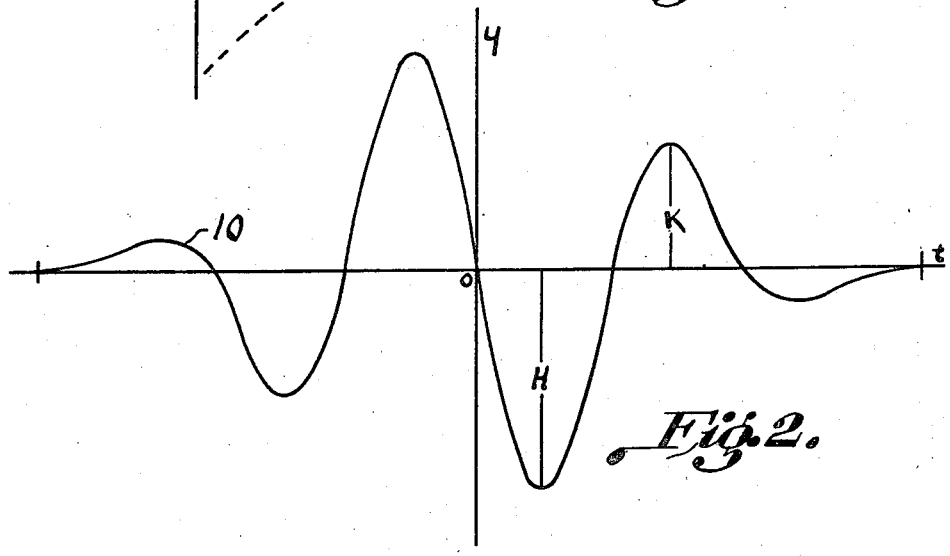
Figure 2 is a graph similarly plotted of the fifth harmonic or fifth derivative wave of the error function $y = e^{-at^2}$.

The wave trains generated by a seismograph, however, are hardly ever pure damped sine waves. The frequency and the ratio of amplitudes of such wave trains are only comparatively constant. Although, from experience it has been found that wave trains produced by seismographs of this type in seismographic prospecting vary quite a bit from one another, it has been found from experience that they are generally of the type shown in Figure 2. The number of cycles and the period of oscillation may be different from the wave train 10 of this figure but, nevertheless, it is possible to obtain the advantages of the invention notwithstanding these variations. It has been found from actual practice that good approximation to the form of individual reflections can be obtained by high order derivatives of the function $y = e^{-at^2}$. The wave train illustrated in Figure 2 is intended to represent the fifth derivative of such a function as follows:

$$y = \frac{d^5}{dt^5} e^{-at^2}$$

$$y = 8e^{-at^2} a^3 t(-4a^2t^4 + 20at^2 - 15)$$

This wave train would be considered a very good reflection wave because it only contains a few oscillations and, therefore, does not require as great a suppression of its terminal portion as would be required in the event that it contained more oscillations and corresponded to still higher derivatives of the function $y = e^{-at^2}$. Wave trains of longer life, that is more oscillations, have the characteristic that the ratio of amplitudes of successive half cycles becomes more constant and, therefore, the degree of suppression of the terminal ends thereof by addition to a similar but delayed wave train approaches the perfect suppression possible with the pure damped sine wave of Figure 1. On the other hand, the suppression of the terminal ends of wave trains of less oscillation become less necessary as the number of oscillations decrease. Therefore, while the method of this invention becomes less effective, it still improves the operation of the apparatus even if to a less degree.

Figure 3:
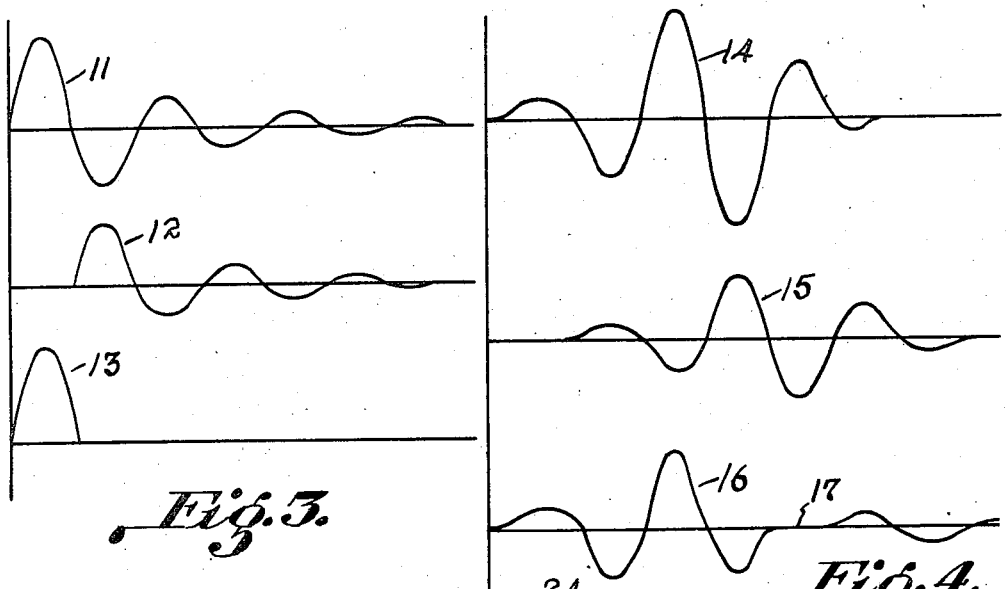
Figure 3 is a set of three graphs similarly plotted illustrating how a pure damped sine wave has its terminal portion suppressed or cancelled in accordance with the principles of this invention.
Figure 4:
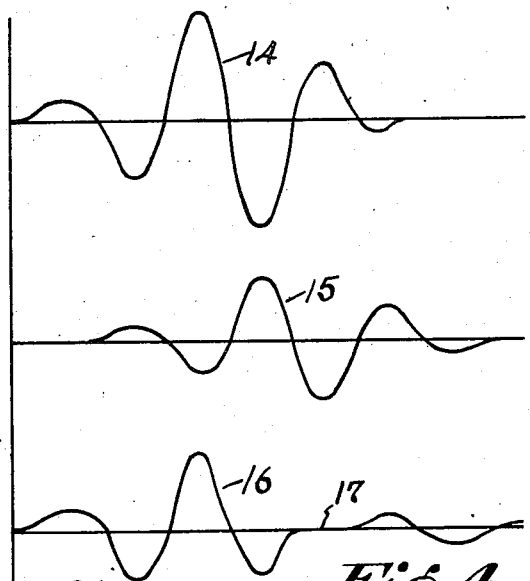
Figure 4 is a set of three graphs similarly plotted showing how the fifth derivative wave of the error function has its terminal portion substantially suppressed or cancelled in accordance with this invention.

There is graphically illustrated in Figure 3 an approach to substantially perfect suppression such as is possible when the wave train is a pure damped sine wave illustrated at 11. In accordance with this invention a similar wave 12 is generated delayed one-half cycle in time of proper amplitude ratio to the wave 11 with the result that when these two waves are combined a single half cycle pulse 13 results. Obviously this idealized condition is not encountered in practice as illustrated by the graphs of Figure 4. Curve 14 is a graphic illustration of the fifth derivative of a wave train likely to be encountered in seismographic prospecting. In accordance with this invention, there is generated a wave train represented by the curve 15 delayed in time one-half cycle and proportioned in amplitude in the ratio of K/H (see Figure 2). This generated wave train is combined with or added to the wave train 14 to produce the highly improved wave train represented by the curve 16 in which the terminal portion of the resultant wave is considerably suppressed, particularly as indicated at 17, to serve to distinguish and separate this wave train from a closely following wave train. Thus the peak of the resultant wave 16 becomes recognizable facilitating the reading of the record. Waves of higher derivatives of $y=e^{-at^2}$ will have their terminal portions suppressed more perfectly and when a sufficiently high harmonic or derivative is treated the suppression attained substantially approaches the prefection of Figure 3.

Figure 5:
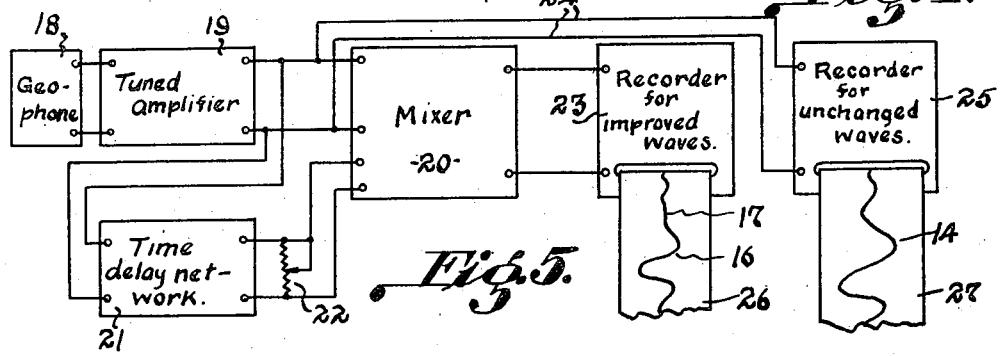
Figure 5 is a schematic illustration of the apparatus of this invention employing the method thereof.

The time delayed wave in accordance with this invention is generated by the seismic wave to be studied and this is accomplished electrically by the combination of apparatus diagrammatically illustrated in Figure 5. This apparatus includes the geophone 18 which consists of any suitable form of vibration sensitive electric instrument capable of converting vibrations, such as earth tremors, into electrical currents representative thereof. Such devices suitable for the purpose are well known in the art of seismic prospecting and include broadly a coil mounted in an electric field so as to be set in vibration by the wave energy transmitted. The output of the geophone 18 is supplied to the input of a tuned amplifier 19 preferably of the vacuum tube type of which many forms are known in the electronic arts. The circuits of the amplifier are preferably designed so as to suppress low frequency ground disturbances and high frequency noises caused by the wind. Under conditions where amplification is not necessary, it is possible to use a properly designed band pass filter in the output circuit of the geophone. The output of the tuned amplifier 19 is applied to the input of the mixer 20. The output circuit of the tuned amplifier 19 is also applied to the input of a time delay network 21 which will be described in greater detail below but which for the moment can be assumed to be a device which will generate a current like that of the output of the amplifier and, hence, that of the geophone, but delayed in time in relation to the original currents by one-half cycle. The output of the time delay network 21 is also applied to the input of the mixer 20. Included in the output circuit of the network is a potentiometer 22 for adjusting the amplitude of the output current of the network in relation to the amplitude of the output current of the amplifier 19. In order that the objects of this invention may be obtained, it is, of course, not desired to completely suppress the currents representative of the vibration energy picked up by the microphone and, therefore, the relative amplitudes of the two currents must be adjusted so that a maximum of suppression of the terminal portions of the original wave train is secured without undue suppression of the central portion of the wave train, a graphic record of which it is desired to study. The output currents of the amplifier 19 and of the network 21 are combined in the mixer 20. This mixer may comprise any suitable circuit arrangement for algebraically combining the two currents and in one suitable and known form may consist of linked vacuum tube circuits. For example, the output of each of these devices may be applied to the input circuits of a pair of triodes having a coupled output circuit so that the algebraic sum of these currents flows in that output circuit. The output of the mixer is applied to a graphic recording device 23, likewise well known and common in the art, which is operated by the output currents of the mixer to transcribe on a moving tape 26 a graphic representation of the voltage fluctuations of that current. Such a record comprises the curve 16 having the pronounced point of suppression 17, as previously described in connection with Figure 4. For comparative purposes, although not essential to this invention, it is noted that a second recorder 25 is connected by the leads 24 to the output of the tuned amplifier 19. This recorder makes a graphic record on a moving tape 27 of the currents representative of the original vibrations unmodified with the result that the curve 14 is produced corresponding to the unchanged curve 14 of Figure 4. Thus there is produced side by side graphic records of the original current and the current as modified in accordance with this invention.

The time delay network 21 may assume many forms which those skilled in electrical circuits are familiar with. A network unit is diagrammatically illustrated in Figure 6 comprising a combination lattice network and a Zobel bridged T network. The input terminals 28 of the network correspond to the leads from the output of the tuned amplifier, as shown in Figure 5. The lattice network comprises a pair of inductors 29 and 30 with these leads cross-connected at opposite ends respectively through the capacitors 31 and 32. The output of this network is connected to the input of the Zobel bridged T network which comprises an inductor 36 across the line between a pair of capacitors 33 and 34 in series with the line and in turn shunted by an inductor 35. In actual use a series of these network units are connected in cascade to give the desired time delay. As previously stated, the output of this combination network is shunted by a potentiometer 22 for reducing the amplitude of the delayed wave train by the proportionality constant of D/C of Figure 1 or K/H of Figure 2 for the purpose previously described. This network is suitable for the purpose since when properly designed it imposes a 180° lag in the current at its output with respect to the current at its input and has the additional desired overall characteristic of having a substantial linear response at different frequencies over a range of frequency variations.

Figure 6:
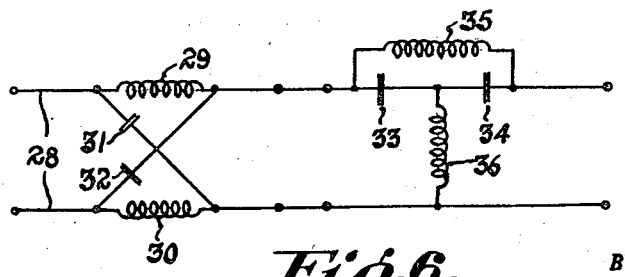
Figure 6 is a diagrammatic illustration of a time delay network forming part of the apparatus of this invention, composed of a lattice network and a Zobel bridged T network.
Figure 8:
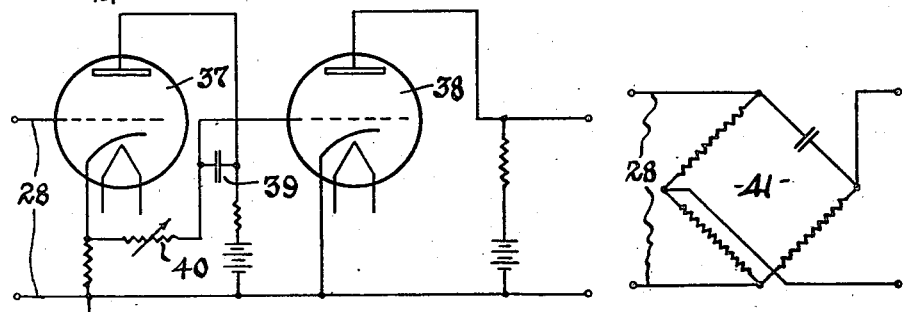
Figure 8 is a vacuum tube coupled bridge network which may be employed in the time delay network of Figure 6.
Figure 7:
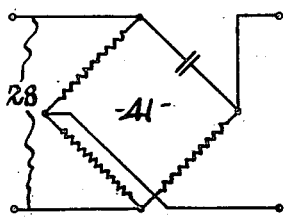
Figure 7 is a diagrammatic illustration of another form of bridge network which may be employed in the time delay network of Figure 6.

In Figure 8 is diagrammatically illustrated a vacuum tube network having the same phase characteristics as the lattice section of Figure 6. In this case the input leads 28 are connected to the input circuit of a triode 37 and the output circuit of that triode is connected through the capacitor 39 to the input circuit of the triode 38. The output circuit of the triode is connected to the input circuit of the Zobel bridge. The variable resistor 40 provides means for controlling the amplitude of the output current of the bridge. In Figure 7 is diagrammatically illustrated another bridge network 41 which can be substituted for the lattice network. Each of these circuits has the desired time delay characteristics in combination with the Zobel bridge to produce the desired object of this invention. Other arrangements of these network elements are suitable for the purpose as those skilled in the art will appreciate and it is unnecessary, therefore, to expand on such obvious alterations thereof.

For further emphasis on the effectiveness of the subject matter of this invention, reference will now be made to Figures 9 to 12 inclusive. In Figure 9 is graphically illustrated the unmodified output current of the geophone when a steel ball is permitted to bounce three times on a surface such as a table.

Figure 10 is a graphic illustration of the same current modified in accordance with this invention to indicate distinctly at 42, 43 and 44 the impact of the ball on the table. One skilled in interpreting such a chart will have no difficulty in securing from such a chart desired statistical data.

Figure 11 is a graphic illustration of the unmodified current produced by a geophone actuated by seismic reflection waves from two closely adjacent formations in the earth.

Figure 12 is a graphic illustration of the same current modified in accordance with this invention to effect suppression at 45 of the terminal portion of the first wave train so as to render more distinct the two wave trains 46 and 47 making it possible for a skilled interpreter to obtain the desired data made available by such indications.

It is specifically emphasized that in the application of this invention it is not necessary to limit the phase shift of the compensating current to one-half cycle since it is within the contemplation of this invention to effect a shift of any integral number of half cycles.

Likewise the invention in its application is not limited to the specific form of electrical means for generating the phase shift or time delay compensating current. It is within the contemplation of this invention to use other arrangements than that illustrated herein as, for example, electromechanical means for producing the same result, as well as optical.

In connection with the use of such optical means, it is contemplated in one application of the invention to produce any suitable form of sound record of the output of the geophone and to practice the rest of the procedure herein disclosed in the laboratory rather than in the field in which case the record will be converted in any number of well known ways into electrical currents fed into the system of Figure 5. In other words, in this form of the invention the system of Figure 5 will be operated by some form of electromechanical means for converting the record into electric currents. In such an arrangement optical methods could be employed for producing the necessary time delay effect. It is, of course, apparent that when working with a record of the vibrations, the system of Figure 5 could be used without change, that is, the electrical time delay network could be used therewith.

In view of the foregoing disclosure, those skilled in the art will readily appreciate that the subject matter of this invention is capable of variation and modification without departure from the novel subject matter thereof. I do not, therefore, desire to be strictly limited to the disclosure as given for purposes of illustration but rather to the scope of the claims granted me.

What is claimed is:

1. In an apparatus of the type described, the combination comprising means for converting physical vibrations into electrical currents comprising closely succeeding wave trains, a tuned amplifier connected to said means and having an output circuit, means connected in said output circuit for generating a similar current delayed in time one-half cycle, said means comprising a time delay network having a substantially linear response over a frequency range and including a plurality of cascaded vacuum tubes, means connected in said output circuit and to said last means for algebraically adding said currents, and means for converting said added currents into a graphic representation thereof.

2. In the combination of claim 1, said time delay network including a combined lattice network and Zobel bridged T network.

3. In the combination of claim 1, said time delay network including a Zobel bridge T network.

RAYMOND G. PIETY.

REFERENCES CITED

The following references are of record in the file of this patent:

UNITED STATES PATENTS

| Number | Name | Date |
|---|---|---|
| 1,544,622 | Affel | July 7, 1925 |
| 2,055,477 | Blau | Sept. 29, 1936 |
| 2,144,812 | Rieber | Jan. 24, 1939 |
| 2,161,764 | Minton | June 6, 1939 |
| 2,184,313 | Owen | Dec. 26, 1939 |
| 2,276,708 | Wyckoff | Mar. 17, 1942 |
| 2,294,627 | Parr | Sept. 1, 1942 |
| 2,304,740 | Minton | Dec. 8, 1942 |
| 2,377,903 | Rieber | June 12, 1945 |